(12) United States Patent
Suzaki et al.

(10) Patent No.: US 11,757,525 B2
(45) Date of Patent: Sep. 12, 2023

(54) COMMUNICATION SYSTEM AND COMMUNICATION METHOD

(71) Applicant: Nippon Telegraph and Telephone Corporation, Tokyo (JP)

(72) Inventors: Kohei Suzaki, Tokyo (JP); Yusuke Asai, Tokyo (JP); Hiroyuki Shiba, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 357 days.

(21) Appl. No.: 17/260,610

(22) PCT Filed: Jun. 27, 2019

(86) PCT No.: PCT/JP2019/025746
§ 371 (c)(1),
(2) Date: Jan. 15, 2021

(87) PCT Pub. No.: WO2020/021960
PCT Pub. Date: Jan. 30, 2020

(65) Prior Publication Data
US 2021/0328658 A1 Oct. 21, 2021

(30) Foreign Application Priority Data
Jul. 24, 2018 (JP) .................... 2018-138820

(51) Int. Cl.
*H04B 7/185* (2006.01)
*H04W 16/26* (2009.01)
(Continued)

(52) U.S. Cl.
CPC ........ *H04B 7/18508* (2013.01); *H04W 16/26* (2013.01); *H04W 16/28* (2013.01); *H04W 88/04* (2013.01)

(58) Field of Classification Search
CPC .. H04B 7/18508; H04W 16/26; H04W 16/28; H04W 88/04
See application file for complete search history.

(56) References Cited

U.S. PATENT DOCUMENTS 9,836,049 B1 * 12/2017 Tu .................... B64C 39/022
2016/0131494 A1 * 5/2016 Lee ...................... B60W 30/14
701/25

(Continued)

OTHER PUBLICATIONS

Sakata et al., "Mobile Ad Hoc Networks and Wireless LAN Mesh Networks," IEICE, Transactions B, 2006, J89-B(6):811-823, 27 pages (with English Translation).

*Primary Examiner* — Mazda Sabouri
(74) *Attorney, Agent, or Firm* — Fish & Richardson P.C.

(57) ABSTRACT

A communication system including a mobile station that communicates with a wireless station and moves toward a predetermined destination, and a relay station that relays communication between the mobile station and the wireless station, includes: the mobile station that pauses movement when sensing an obstacle present on a first moving route toward the destination in a case of moving along the first moving route, and moves along a second moving route headed to the destination while avoiding the obstacle when establishing communication between the mobile station and the wireless station via the relay station in a case where the movement is paused; and the relay station that moves so as to keep a position where communication between the mobile station and the wireless station can be relayed according to movement of the mobile station when the mobile station moves along the second moving route.

12 Claims, 7 Drawing Sheets

(51) Int. Cl.
*H04W 16/28* (2009.01)
*H04W 88/04* (2009.01)

(56) References Cited

U.S. PATENT DOCUMENTS

| | | | |
|---|---|---|---|
| 2017/0012697 A1* | 1/2017 | Gong | H04W 16/18 |
| 2018/0033315 A1* | 2/2018 | Winkle | G08G 5/0013 |
| 2021/0163106 A1* | 6/2021 | Sherry | B63G 8/001 |
| 2021/0288714 A1* | 9/2021 | Liang | G05D 1/0022 |

* cited by examiner

COMMUNICATION SYSTEM AND COMMUNICATION METHOD

CROSS-REFERENCE TO RELATED APPLICATIONS

This application is a National Stage application under 35 U.S.C. § 371 of International Application No. PCT/JP2019/025746, having an International Filing Date of Jun. 27, 2019, which claims priority to Japanese Application Serial No. 2018-138820, filed on Jul. 24, 2018. The disclosure of the prior application is considered part of the disclosure of this application, and is incorporated in its entirety into this application.

TECHNICAL FIELD

The present invention relates to a communication system and a communication method.

BACKGROUND ART

In wireless communication, in addition to communication between fixed station apparatuses and communication between a mobile station apparatus and a base station apparatus, attention has recently been attracted to communication between a mobile station apparatus and a base station apparatus using a mobile station apparatus as a relay station and communication between mobile station apparatuses (M2M; machine-to-machine). In the above wireless communication, a wireless communication scheme based on the IEEE (the institute of electrical and electronics engineers, Inc.) 802.11 standard typified by Wi-Fi or the like and a wireless communication scheme that is a cellular scheme such as LTE (registered trademark) (long term evolution) have been used generally.

However, the above wireless communication schemes may not be suitable when a mobile station performs large capacity transmission such that the total throughput is 100 Mbps or higher while moving in a relatively wide range. The reason is that the longer the distance between wireless station apparatuses is, the more the power received at a wireless station apparatus attenuates, so that a desired C/N ratio (carrier to noise ratio) is not satisfied.

In order for a mobile station to perform large capacity transmission while moving in a relatively wide range, it is necessary to utilize a frequency in a millimeter wave band such as 28 GHz or 60 GHz. A millimeter wave has a short wavelength, and therefore, as its manner of transmission, has characteristics of strong straightness and difficulty in coming around behind an obstacle such as a building. Then, when it is difficult for wireless station apparatuses to communicate with each other directly, it is conceivable to use a multi-hop network in which communication is performed via another wireless station apparatus (relay station) (e.g., Non-Patent Literature 1).

CITATION LIST

Non-Patent Literature

Non-Patent Literature 1: S. Sakata, et al., "Mobile Ad Hoc Networks and Wireless LAN Mesh Networks", the transactions of the Institute of Electronics, Information and Communication Engineers B Vol. J89-B No. 6, pp. 811-823, Incorporated Association: the Institute of Electronics, Information and Communication Engineers, 2006.

SUMMARY OF THE INVENTION

Technical Problem

Now, for example, when a mobile station apparatus mounted on a drone or the like that moves toward a destination communicates with a base station apparatus using millimeter waves, an obstacle such as a building may be present between the destination and the base station apparatus or between the destination and the relay station. In this case, when the mobile station apparatus has reached the destination, the mobile station apparatus is positioned behind the obstacle with respect to the position of the base station apparatus or the relay station, and therefore it is difficult to perform communication.

Then, although it is conceivable to use the above multi-hop network to build a communication path that avoids the obstacle, in this case, it is necessary to dynamically control the configuration of the multi-hop network according to a change in the positional relationship among the destination, the mobile station apparatus, the base station apparatus, the relay station, and the obstacle that is caused by an action of the mobile station apparatus to move while avoiding the obstacle. However, the technique described in Non-Patent Literature 1 aims at securing, for example, as a lifeline at the time of disaster, temporary communication means as a backup of the existing wired network, so it is difficult to dynamically control the configuration of the multi-hop network. Thus, when an obstacle is present, conventional techniques have a problem that it may be difficult to secure a communication path between a mobile station apparatus and a base station apparatus.

Considering the above circumstances, an object of the present invention is to provide a technique capable of securing a communication path between a mobile station apparatus and a wireless station apparatus even when an obstacle is present.

Means for Solving the Problem

An aspect of the present invention is a communication system including a mobile station that communicates with a wireless station and moves toward a predetermined destination, and a relay station that relays communication between the mobile station and the wireless station, wherein: the mobile station pauses movement when sensing an obstacle present on a first moving route toward the destination in a case of moving along the first moving route, and moves along a second moving route headed to the destination while avoiding the obstacle when establishing communication between the mobile station and the wireless station via the relay station in a case where the movement is paused; and the relay station moves so as to keep a position where communication between the mobile station and the wireless station can be relayed according to movement of the mobile station when the mobile station moves along the second moving route.

An aspect of the present invention is the communication system described above, wherein the relay station keeps the position where relay is possible by moving so as to keep a position where the mobile station and the wireless station can be seen without obstruction.

An aspect of the present invention is the communication system described above, wherein the relay station moves so as to be positioned in a region where the mobile station is present out of two regions divided by a straight line passing through a position on a plane of the destination and a position on a plane of the obstacle.

An aspect of the present invention is the communication system described above, wherein the relay station moves so as to be positioned in a region where the mobile station is present out of two regions divided by a straight line passing through a position on a plane of the mobile station and a position on a plane of the obstacle.

An aspect of the present invention is the communication system described above, wherein the relay station moves so that a difference between a value indicating communication quality of communication between the mobile station and the relay station and a value indicating communication quality of communication between the wireless station and the relay station becomes less than or equal to a predetermined threshold.

An aspect of the present invention is a communication method which involves a mobile station that communicates with a wireless station and moves toward a predetermined destination, and a relay station that relays communication between the mobile station and the wireless station, the communication method including: a step of the mobile station pausing movement when sensing an obstacle present on a first moving route toward the destination in a case of moving along the first moving route; a step of the mobile station moving along a second moving route headed to the destination while avoiding the obstacle when establishing communication between the mobile station and the wireless station via the relay station in a case where the movement is paused; and a step of the relay station moving so as to keep a position where communication between the mobile station and the wireless station can be relayed according to movement of the mobile station when the mobile station moves along the second moving route.

Effects of the Invention

The present invention makes it possible to secure a communication path between a mobile station apparatus and a wireless station apparatus even when an obstacle is present.

DESCRIPTION OF EMBODIMENTS

Communication systems according to embodiments of the present invention will be described below with reference to the drawings.

The communication system according to each embodiment described below is, by way of example, a communication system for a mobile station apparatus mounted on a drone that moves (flies) toward a destination and a base station apparatus (fixed station) to communicate with each other via a mobile station apparatus (relay station) mounted on another drone as necessary.

Hereinafter, the drone on which the mobile station apparatus that moves toward the destination is mounted will simply be referred to as "mobile station". The base station apparatus will simply be referred to as "base station". The drone on which the mobile station apparatus serving as the relay station is mounted will simply be referred to as "relay station".

First Embodiment

The communication system according to the first embodiment will be described below.

Figure 1:
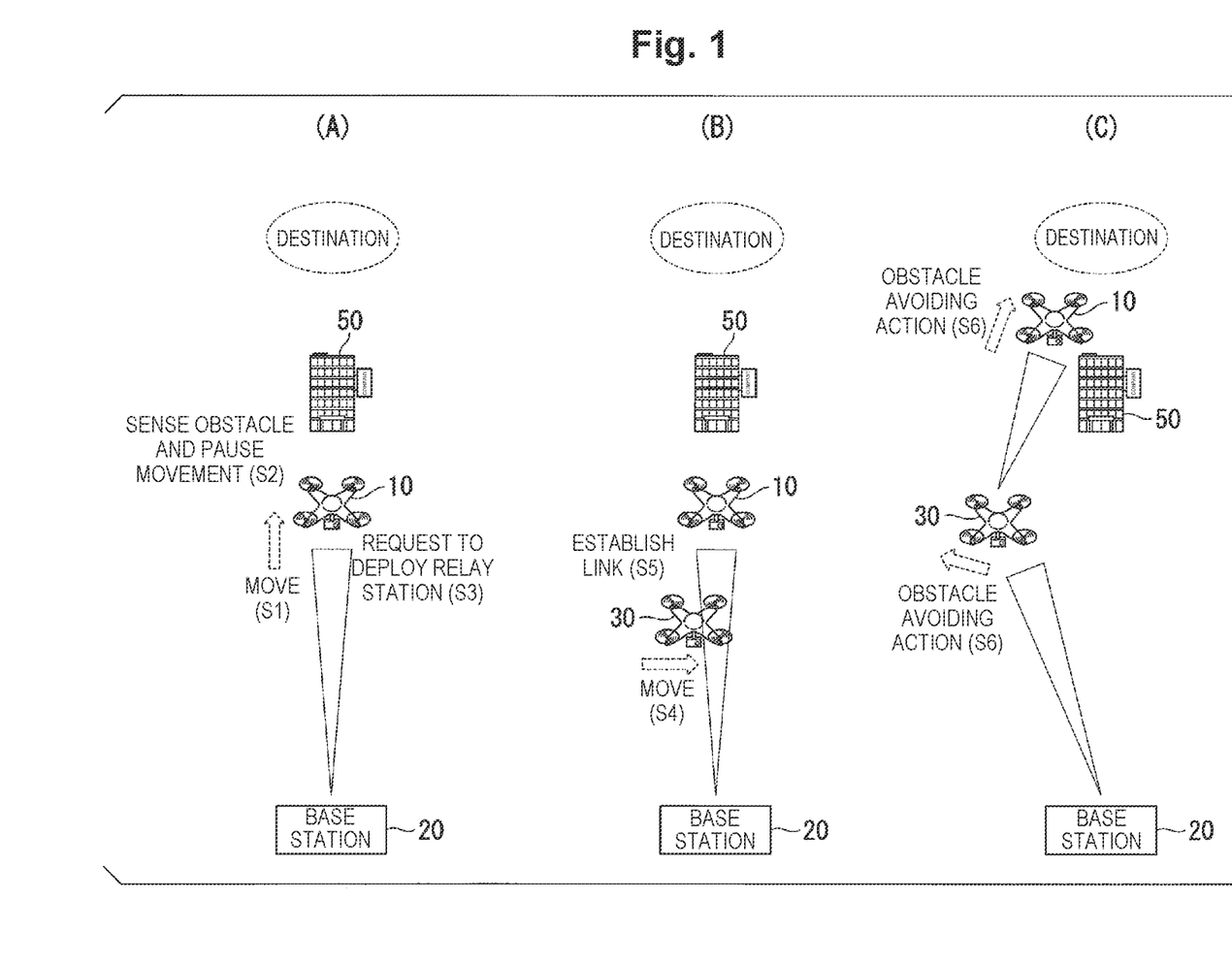
FIG. 1 is a schematic diagram for explaining the overview of a communication method used by a communication system according to a first embodiment of the present invention.

FIG. 1 is a schematic diagram for explaining the overview of a communication method used by the communication system according to the first embodiment of the present invention.

As shown in FIG. 1(A), an obstacle 50 (e.g., a building) is present between a destination to which a mobile station 10 is headed and a base station 20. First, the mobile station 10 having established a link with the base station 20 moves toward the destination, for example, with the neighborhood of the base station 20 as the point of departure (S1). The mobile station 10 pauses its movement when sensing an obstacle 50 on the moving route to the destination (S2). The mobile station 10 transmits a notification for requesting deployment of a relay station 30 to the base station 20 (S3). The base station 20 receives the notification transmitted from the mobile station 10.

Next, the base station 20 transmits a notification for causing relay of communication between the mobile station 10 and the base station 20 to the relay station 30. When receiving the notification transmitted from the base station 20, the relay station 30 moves into a beam of radio waves emitted by the base station 20 shown in FIG. 1(B) (S4). Consequently, handover is performed between the mobile station 10 and the base station 20, and links are established between the mobile station 10 and the relay station 30 and between the base station 20 and the relay station 30 (35).

Next, when the link with the relay station 30 has been established, the mobile station 10 restarts moving, and moves toward the destination along a new moving route that avoids the obstacle 50. The relay station 30 moves in conjunction with the mobile station 10 so as to keep a position where communication between the mobile station 10 and the base station 20 can be relayed according to a change in the relative positional relationship among the destination, the mobile station 10, the base station 20, the relay station 30 itself, and the obstacle 50 due to the movement of the mobile station 10. Thus, each of the mobile station 10 and the relay station 30 performs an obstacle avoiding action indicating movement for avoiding the obstacle 50 (36).

As described above, according to the communication system according to the first embodiment, even when the obstacle 50 is present on the moving route of the mobile station 10, the mobile station 10 and the relay station 30 take their obstacle avoiding actions in conjunction with each other, thereby enabling a communication path to be secured between the mobile station 10 and the base station 20.

Note that, for example, when a plurality of obstacles 50 are present, a plurality of relay stations 30 may relay communication between the mobile station 10 and the base station 20. In this case, a newly-deployed relay station 30 moves in conjunction with the mobile station 10 and other already-deployed relay stations 30 so as to keep a position where communication between the mobile station 10 and the base station 20 can be relayed according to a change in the relative positional relationship among the destination, the mobile station 10, the other already-deployed relay stations 30, the relay station 30 itself, and the obstacles 50 due to the movement of the mobile station 10.

Note that the mobile station 10 and the relay station 30 perform wireless communication with an opposite station using, for example, a directional antenna (not shown) (hereinafter referred to as "antenna"). Therefore, the mobile station 10 and the relay station 30 are provided with a tracking mechanism for tracking the opposite station. Note that, for example, for a narrow beam antenna used for long-distance wireless communication, the width of the beam of radio waves emitted from the antenna (hereinafter referred to as "beam spread") is about 30 cm at a position 10 m ahead of the emitting position of the beam. Accordingly, when the position of the opposite station to be tracked does not fall within this beam spread, the mobile station 10 and the relay station 30 cannot track the opposite station.

An example of the above obstacle avoiding actions by the mobile station 10 and the relay station 30 will be described below.

The mobile station 10 and the relay station 30 are provided with a camera (not shown), an image processing engine (not shown), and the tracking mechanism (not shown). The camera captures an image in the direction of the opposite station. The camera outputs image data indicating the captured image to the image processing engine. The image processing engine analyzes the image data input from the camera to identify an image region indicating the opposite station in the image based on the image data.

Note that, for example, the image processing engine may hold in advance image data (master image data) indicating an image in which the opposite station is captured, and collate the master image data with image data input from the camera, thereby identifying an image region indicating the opposite station in the image.

The image processing engine controls the tracking mechanism so that the image region indicating the opposite station may be positioned at the center of the image based on the image data input from the camera. The tracking mechanism is configured to be able to control the orientation of its own mobile station 10 or its own relay station 30. This enables the tracking mechanism to control the image capturing direction of the camera provided in the mobile station 10 and the relay station 30 by controlling the orientation of its own mobile station 10 or its own relay station 30.

Note that it is assumed that the image capturing direction of the camera and the emitting direction of the beam of radio waves emitted from the antenna are configured to coincide with each other. Consequently, a beam will be emitted toward a position appearing at the center of the image based on the image data input from the camera.

The mobile station 10 and the relay station 30 detects the obstacle 50 (e.g., a shielding object and a reflecting object such as a building) using the image processing engine. When it is predicted that the movement of the own wireless station apparatus (the mobile station 10 or the relay station 30) or the movement of the opposite station is accompanied by the movement of the opposite station to a position outside the range of a region that can be tracked by the tracking mechanism (e.g., a position behind the obstacle 50) due to the influence of the obstacle 50, the wireless station apparatus (the mobile station 10 and the relay station 30) moves to a position where clearance can be taken (where they can be seen without obstruction) between the wireless station apparatus itself (the mobile station 10 or the relay station 30) and the opposite station.

Figure 2:
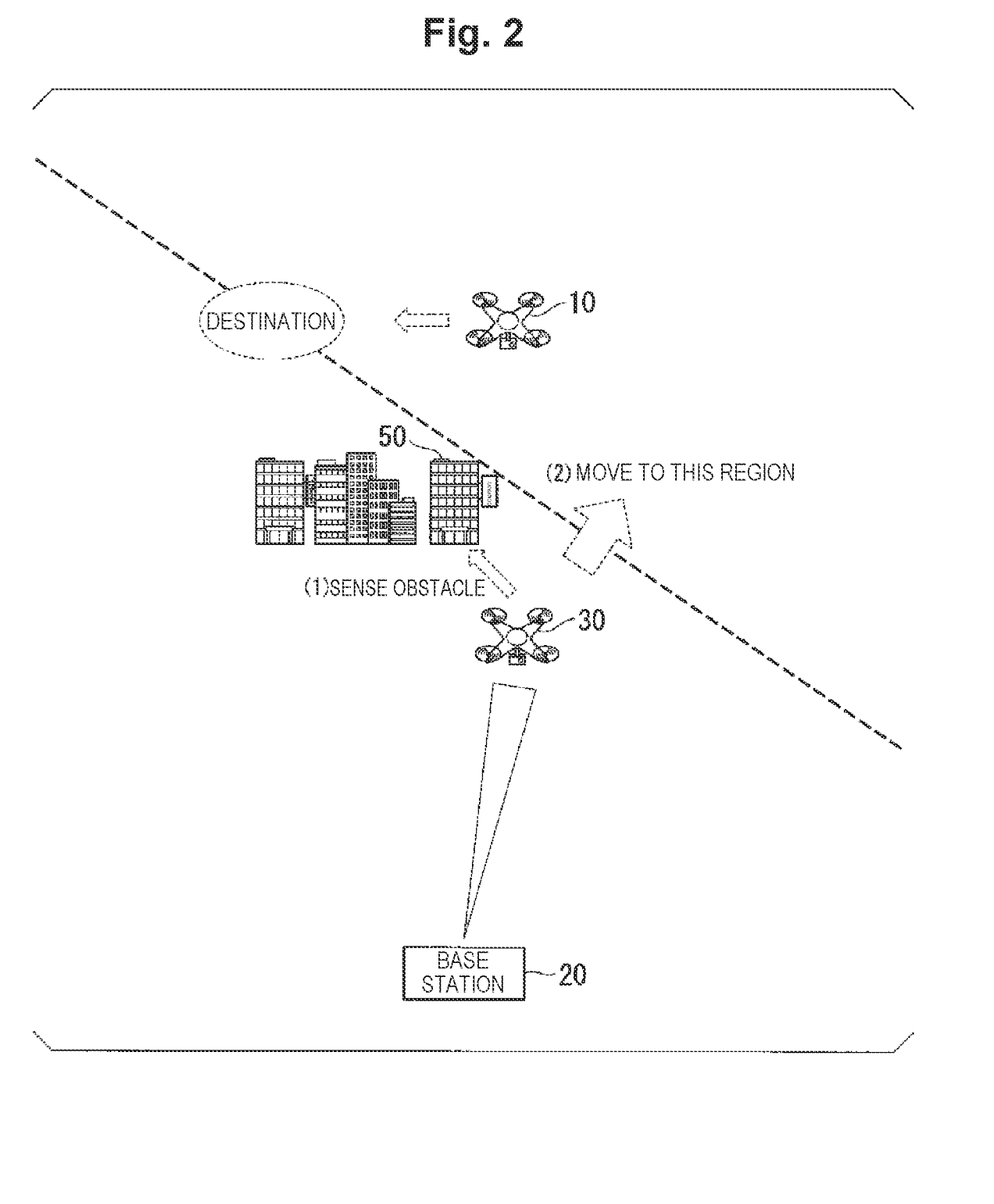
FIG. 2 is a schematic diagram for explaining the overview of an obstacle avoiding action by the communication system according to the first embodiment of the present invention.

As used herein, movement in a direction enabling clearance to be taken refers to, for example, as shown in FIG. 2, movement of the relay station 30 toward a region where the mobile station 10 is present out of two regions divided by a straight line passing through a position on the plane of the destination to which the mobile station 10 is headed and a position on the plane of the obstacle 50. Note that movement in a direction enabling clearance to be taken may refer to, for example, continual movement such that the relay station 30 is always positioned in the region where the mobile station 10 is present out of the two regions divided by the straight line passing through the position on the plane of the mobile station 10 and the position on the plane of the obstacle 50.

Note that as a way to sense the obstacle 50, for example, the mobile station 10 may sense the obstacle 50 using a camera, a sensor, or the like. Alternatively, for example, the mobile station 10 or the base station 20 may hold in advance data indicating the position of the obstacle 50, and sense the obstacle 50 based on the data. Alternatively, for example, the mobile station 10 may sense the obstacle 50 based on the actual situation of deterioration in communication and the like.

[Functional Configuration of Communication System]

The functional configuration of the communication system will be described below with reference to the drawings.

Figure 3:
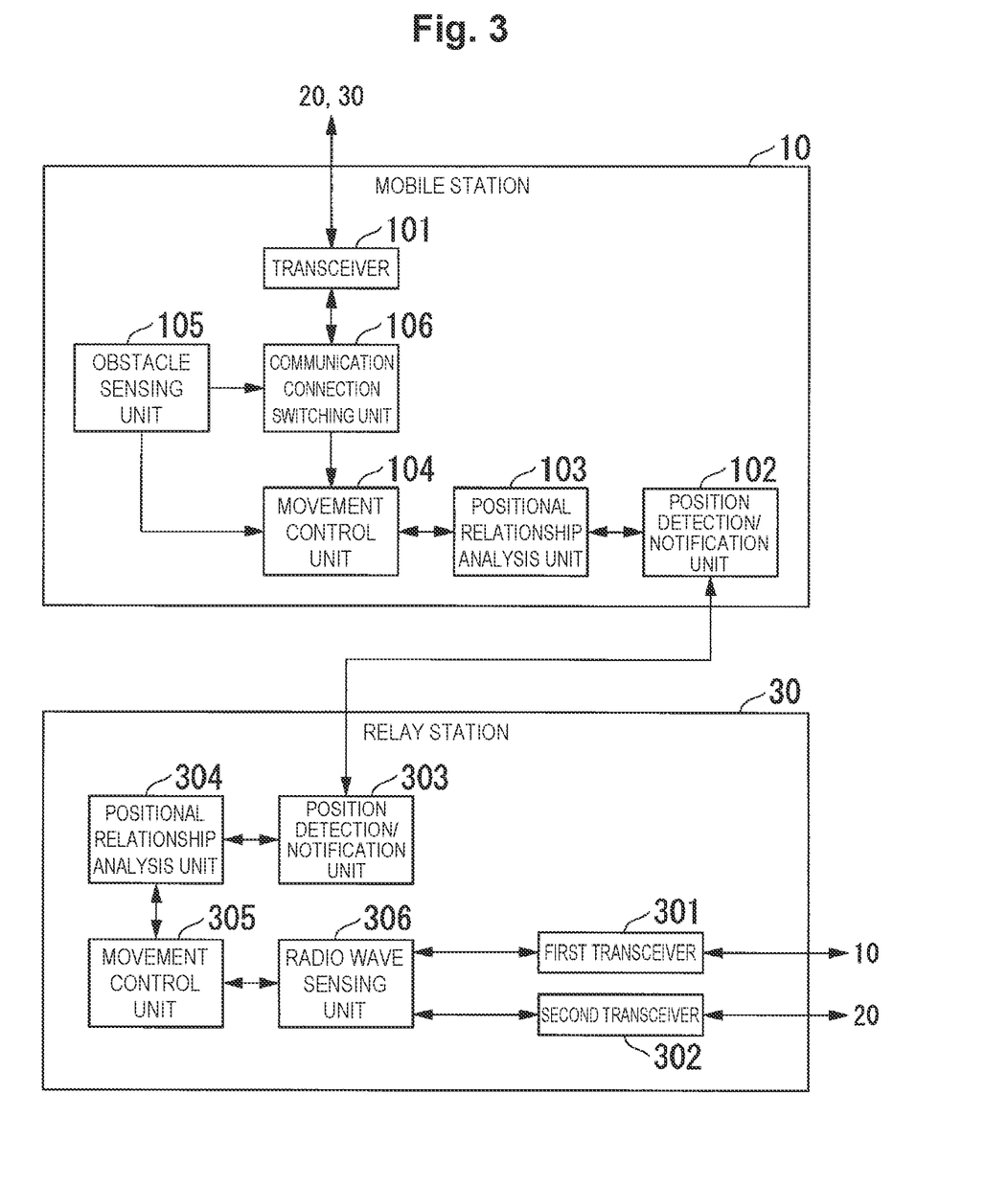
FIG. 3 is a block diagram showing a functional configuration of the communication system according to the first embodiment of the present invention.

FIG. 3 is a block diagram showing the functional configuration of the communication system according to the first embodiment of the present invention. As shown in FIG. 3, the communication system is configured to include the mobile station 10 and the relay station 30.

The mobile station 10 is configured to include a transceiver 101, a position detection/notification unit 102, a positional relationship analysis unit 103, a movement control unit 104, an obstacle sensing unit 105, and a communication connection switching unit 106.

The transceiver 101 communicates with the base station 20 via the relay station 30 or not via the relay station 30. The transceiver 101 is configured to include an antenna (not shown).

The position detection/notification unit 102 detects the positions of various objects such as its own mobile station 10, the relay station 30, and the obstacle 50. The position detection/notification unit 102 notifies the relay station 30 of information indicating the detected position of its own mobile station 10, information indicating the detected position of the obstacle 50, and information indicating the position of the destination. The position detection/notification unit 102 is configured to include an apparatus capable of measuring a position, for example, a GNSS (global navigation satellite system) such as a GPS (global positioning system) and a GLONASS (global navigation satellite system), a gyro sensor, a position measuring sensor, a distance measuring sensor, or a camera and an image analysis apparatus.

The positional relationship analysis unit 103 analyzes positional relationship of each of the destination, its own mobile station 10, the base station 20, the relay station 30, and the obstacle 50.

Note that the information indicating the position of the destination is stored in advance in, for example, a storage medium (not shown) provided in the mobile station 10. Alternatively, a configuration is possible in which the information indicating the position of the destination is stored in advance in a storage medium (not shown) provided in advance in the base station 20, and the mobile station 10 acquires the information indicating the position of the destination from the base station 20 each time when necessary.

The movement control unit 104 controls the movement of its own mobile station 10 along a moving route to the destination (a first moving route) that is determined based on the positional relationship analyzed by the positional relationship analysis unit 103.

The movement control unit 104 pauses the movement of its own mobile station 10 according to a notification from the obstacle sensing unit 105 (i.e., causes the drone, which is its own mobile station 10, to stand still). The notification is a notification indicating that the obstacle sensing unit 105 has sensed the obstacle 50 on the moving route to the destination.

The movement control unit 104 restarts the paused movement of its own mobile station 10 according to a notification from the communication connection switching unit 106. The notification is a notification indicating that the communication connection switching unit 106 has made the switch to communication connection with the base station 20 via a new relay station 30. In this case, the movement control unit 104 moves its own mobile station 10 along a moving route that avoids the obstacle 50 (a second moving route).

The obstacle sensing unit 105 senses the obstacle 50 (e.g., a building) that is present on the moving route (the first moving route) of the mobile station 10 that moves toward the destination. The obstacle sensing unit 105 notifies the movement control unit 104 and the communication connection switching unit 106 that it has sensed the obstacle 50. The obstacle sensing unit 105 is configured to include an apparatus capable of sensing obstacles such as an infrared sensor, an ultrasonic sensor, a camera, and an image analysis apparatus.

When being notified by the obstacle sensing unit 105 that it has sensed the obstacle 50, the communication connection switching unit 106 transmits a notification indicating a request to deploy a relay station 30 to the base station 20 via the transceiver 101. This causes a new relay station 30 to be deployed under control of the base station 20. Note that a configuration is possible in which the mobile station 10 directly requests a relay station 30 to relay communication between the mobile station 10 itself and the base station 20.

When sensing that the transceiver 101 has received radio waves sent out from a new relay station 30, the communication connection switching unit 106 performs handover, and switches the link so that communication between its own mobile station 10 and the relay station 30 may be performed via the new relay station 30.

The relay station 30 is configured to include a first transceiver 301, a second transceiver 302, a position detection/notification unit 303, a positional relationship analysis unit 304, a movement control unit 305, and a radio wave sensing unit 306.

The first transceiver 301 communicates with the mobile station 10. The second transceiver 302 communicates with the base station 20. Each of the first transceiver 301 and the second transceiver 302 is configured to include an antenna (not shown).

The position detection/notification unit 303 detects the positions of various objects such as its own relay station 30, the mobile station 10, and the obstacle 50. The position detection/notification unit 303 notifies the mobile station 10 of the information indicating the detected position of its own relay station 30. The position detection/notification unit 303 is configured to include an apparatus capable of measuring a position, for example, a GNSS such as a GPS or a GLONASS, a gyro sensor, a position measuring sensor, a distance measuring sensor, a camera and an image analysis apparatus.

The positional relationship analysis unit 304 analyzes the positional relationship of each of its own relay station 30, the mobile station 10, the base station 20, and the obstacle 50.

The movement control unit 305 moves its own relay station 30 to any position within the emission range of the beam of radio waves emitted from the base station 20 according to a notification from the base station 20. The notification is a notification indicating a request to relay communication between the mobile station 10 and the base station 20.

The movement control unit 305 controls the movement of its own relay station 30 so as to keep a position where each of the mobile station 10 and the base station 20 can be seen without obstruction based on the positional relationship analyzed by the positional relationship analysis unit 304.

Note that the movement control unit 305 may control the movement of its own relay station 30 so that it may be positioned in a region where the mobile station 10 is present out of two regions divided by a straight line passing through a position on the plane of the destination to which the mobile station 10 is headed and a position on the plane of the obstacle 50. Alternatively, the movement control unit 305 may control the movement of its own relay station 30 so that it may be positioned in a region where the mobile station 10 is present out of two regions divided by a straight line passing through a position on the plane of the mobile station 10 and a position on the plane of the obstacle 50.

When sensing radio waves sent out from the base station 20, the radio wave sensing unit 306 establishes a link between the base station 20 and its own relay station. The radio wave sensing unit 306 sends out radio waves to the mobile station 10 via the first transceiver 301. This makes it possible to cause the mobile station 10 to recognize that the own relay station 30 is present at a position where it can relay communication between the mobile station 10 and the base station 20.

[Operation of Communication System]

An example of operation of the communication system will be described below with reference to the drawings.

Figure 4:
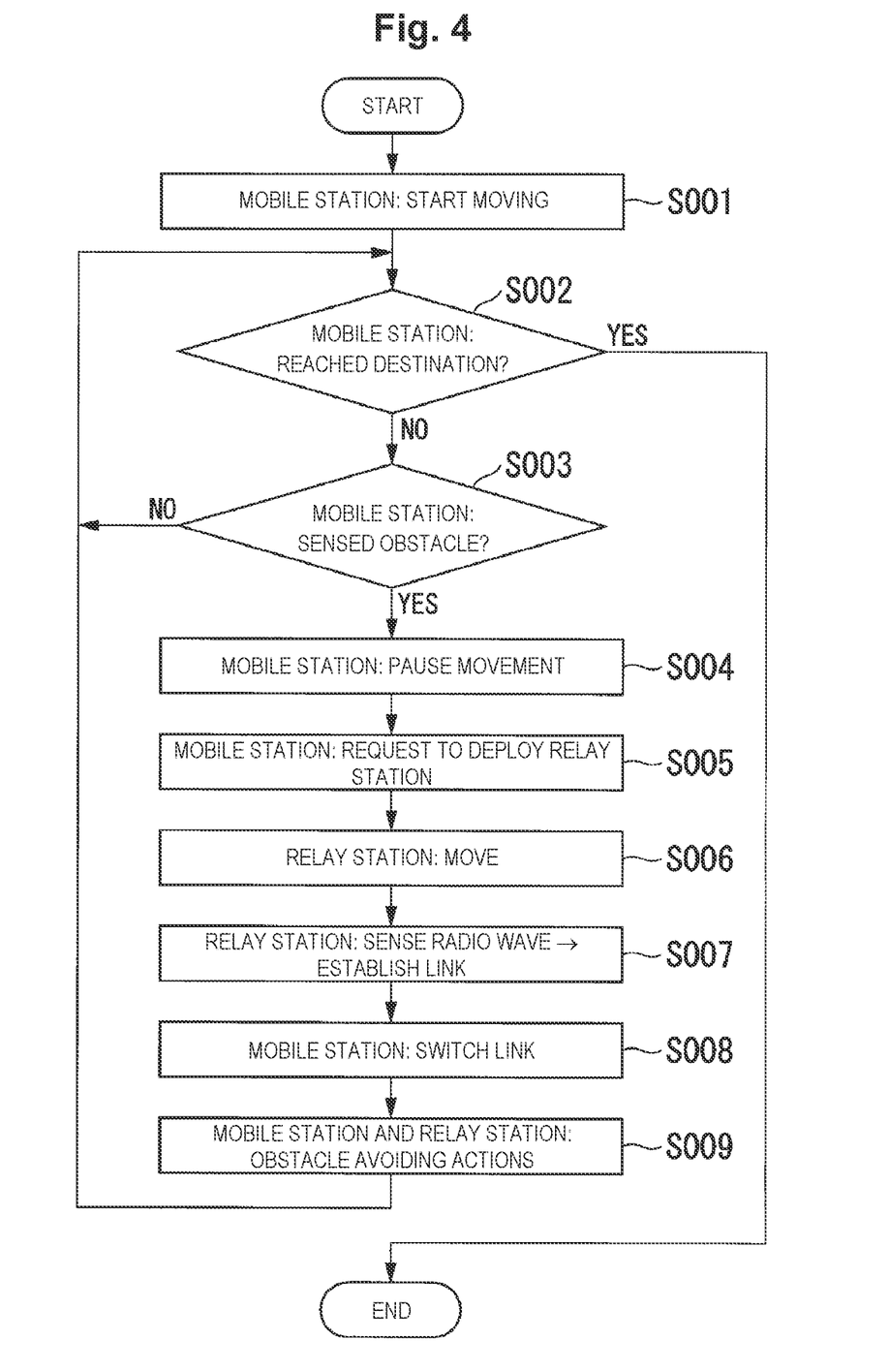
FIG. 4 is a flowchart showing operation of the communication system according to the first embodiment of the present invention.

FIG. 4 is a flowchart showing operation of the communication system according to the first embodiment of the present invention.

The mobile station 10 starts moving along a moving route toward the destination (step S001).

When the mobile station 10 has reached the destination (step S002: Yes), the process shown in the flowchart of FIG. 4 ends.

When the mobile station 10 has not reached the destination (step S002: No), the mobile station 10 continues to move.

When the mobile station 10 has not sensed that the obstacle 50 is present on the moving route toward the destination (step S003: No), the mobile station 10 continues to move.

When the mobile station 10 has sensed that the obstacle 50 is present on the moving route toward the destination (step S003: Yes), the mobile station 10 pauses its movement (step S004), and transmits a notification indicating a request to deploy a new relay station 30 to the base station 20 (step S005).

The relay station 30 moves the relay station 30 itself to any position within the emission range of the beam of radio waves emitted from the base station 20 according to the notification from the base station 20 (step S006). The notification is a notification indicating a request to relay communication between the mobile station 10 and the base station 20.

When sensing radio waves sent out from the base station 20, the relay station 30 establishes a link between the base station 20 and the relay station itself (step S007). The relay station 30 sends out radio waves to the mobile station 10.

When receiving radio waves sent out from the relay station 30, the mobile station 10 performs handover and switches the link so that communication between the mobile station 10 itself and the base station 20 may be performed via the relay station 30 (step S008).

When each of the link between the mobile station 10 and the relay station 30 and the link between the base station 20 and the relay station 30 has been established, the mobile station 10 restarts moving along the moving route that avoids the obstacle 50. The relay station 30 moves so as to keep a position where communication between the mobile station 10 and the base station 20 can be relayed according to the movement of the mobile station 10. That is, the mobile station 10 and the relay station 30 start their obstacle avoiding actions (step S009).

Until the mobile station 10 reaches the destination, the mobile station 10 and the relay station 30 repeat the process from step S002 to step S009 described above.

Second Embodiment

A second embodiment of the present invention will be described below.

A communication system according to the second embodiment performs control relating to communication quality in addition to the processing by the communication system according to the first embodiment described above. Specifically, the communication system according to the second embodiment performs control so that communication between the mobile station 10 and the relay station 30 and communication between the base station 20 and the relay station 30 may not have a difference in communication quality higher than or equal to a predetermined threshold. This enables the communication system according to the second embodiment to prevent deterioration in the communication quality of the overall communication path due to only the communication quality in a partial section of the communication path between the mobile station 10 and the base station 20 significantly decreasing to cause a bottleneck.

In the communication system according to the second embodiment, when the relay station 30 moves for taking clearance with the mobile station 10, resulting in an increase in the distance between the base station 20 and the relay station 30, so that the communication quality of communication between the base station 20 and the relay station 30 has become less than or equal to a predetermined threshold, the relay station 30 pauses its movement, and only the mobile station 10 moves toward the destination. This is because when the relay station 30 further moves, resulting in a further increase in the distance between the base station 20 and the relay station 30, only the communication quality between the base station 20 and the relay station 30 further decreases, and it is predicted that this becomes a bottleneck to decrease the communication quality of the overall communication path.

When the relay station 30 pauses its movement and only the mobile station 10 moves toward the destination, the distance between the mobile station 10 and the relay station 30 in turn increases. This decreases the communication quality of communication between the mobile station 10 and the relay station 30. Then, at a time point when the communication quality of communication between the base station 20 and the relay station 30 has become higher than or equal to the communication quality of communication between the mobile station 10 and the relay station 30, the relay station 30 restarts moving.

Note that although the index of communication quality is as described above when it is an index that takes a continuous value such as a reception level or throughput, the index of communication quality may be an index that takes a discrete value such as an MCS (modulation and coding scheme, a combination of a modulation scheme and a coding rate) index value.

Figure 5:
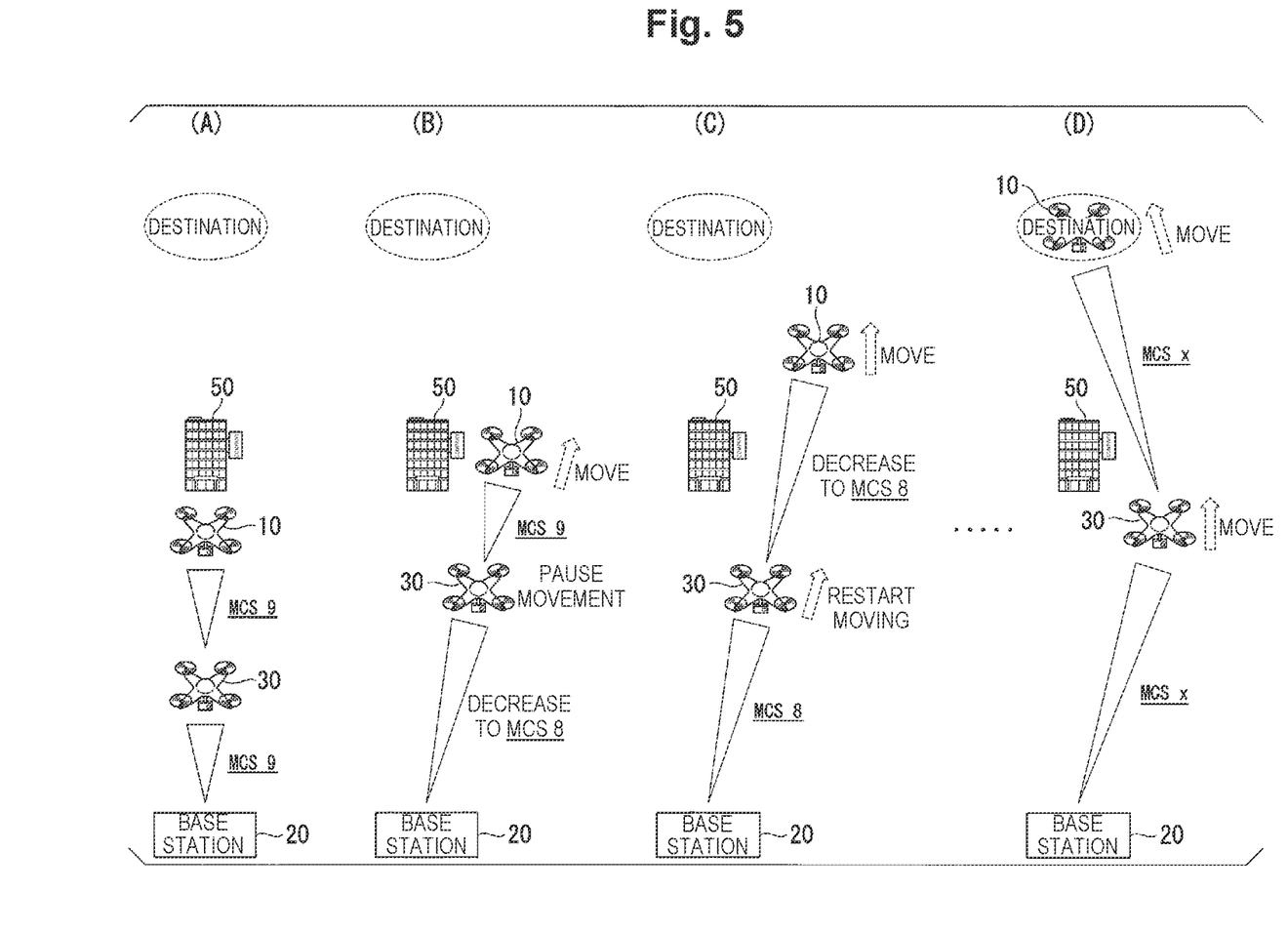
FIG. 5 is a schematic diagram for explaining the overview of a communication method used by a communication system according to a second embodiment of the present invention.

FIG. 5 is a schematic diagram for explaining the overview of a communication method used by the communication system according to the second embodiment of the present invention. FIG. 5 shows, by way of example, the communication method in the case where the index of communication quality is an MCS index value.

As shown in FIG. 5(A), first, at a time point when the mobile station 10 and the relay station 30 start moving, the MCS index value in communication between the mobile station 10 and the relay station 30 and the MCS index value in communication between the base station 20 and the relay station 30 are both "9", and communication quality is nearly equal.

When the mobile station 10 moves toward the destination and the relay station 30 moves accordingly, the distance between the base station 20 and the relay station 30 further increases to cause a decrease in the reception level and the like, and, as shown in FIG. 5(B), for example, the MCS index value in communication between the base station 20 and the relay station 30 decreases to "8". In this case, the relay station 30 pauses its movement. Consequently, only the mobile station 10 moves toward the destination.

When only the mobile station 10 moves toward the destination, the distance between the mobile station 10 and the relay station 30 increases to cause a decrease in the reception level and the like, and, as shown in FIG. 5(C), for example, the MCS index value in communication between the mobile station 10 and the relay station 30 decreases to "8". The MCS index value in communication between the mobile station 10 and the relay station 30 and the MCS index value in communication between the base station 20 and the relay station 30 both become "8" to have no difference in communication quality, so that the relay station 30 restarts moving.

In the communication system according to the second embodiment, the mobile station 10 moves toward the destination while the relay station 30 is repeating the operation in FIG. 5(A) to FIG. 5(C). Consequently, as shown in FIG. 5(D), also at a time point when the mobile station 10 has reached the destination, communication between the mobile station 10 and the relay station 30 and communication between the base station 20 and the relay station 30 do not have a large difference in communication quality. Thus, the communication system according to the second embodiment can prevent a rapid decrease in communication quality in a specific section of the communication path, and control the communication quality so that the communication quality of the overall communication path may gradually decrease.

[Functional Configuration of Communication System]

The functional configuration of the communication system will be described below with reference to the drawings.

Figure 6:
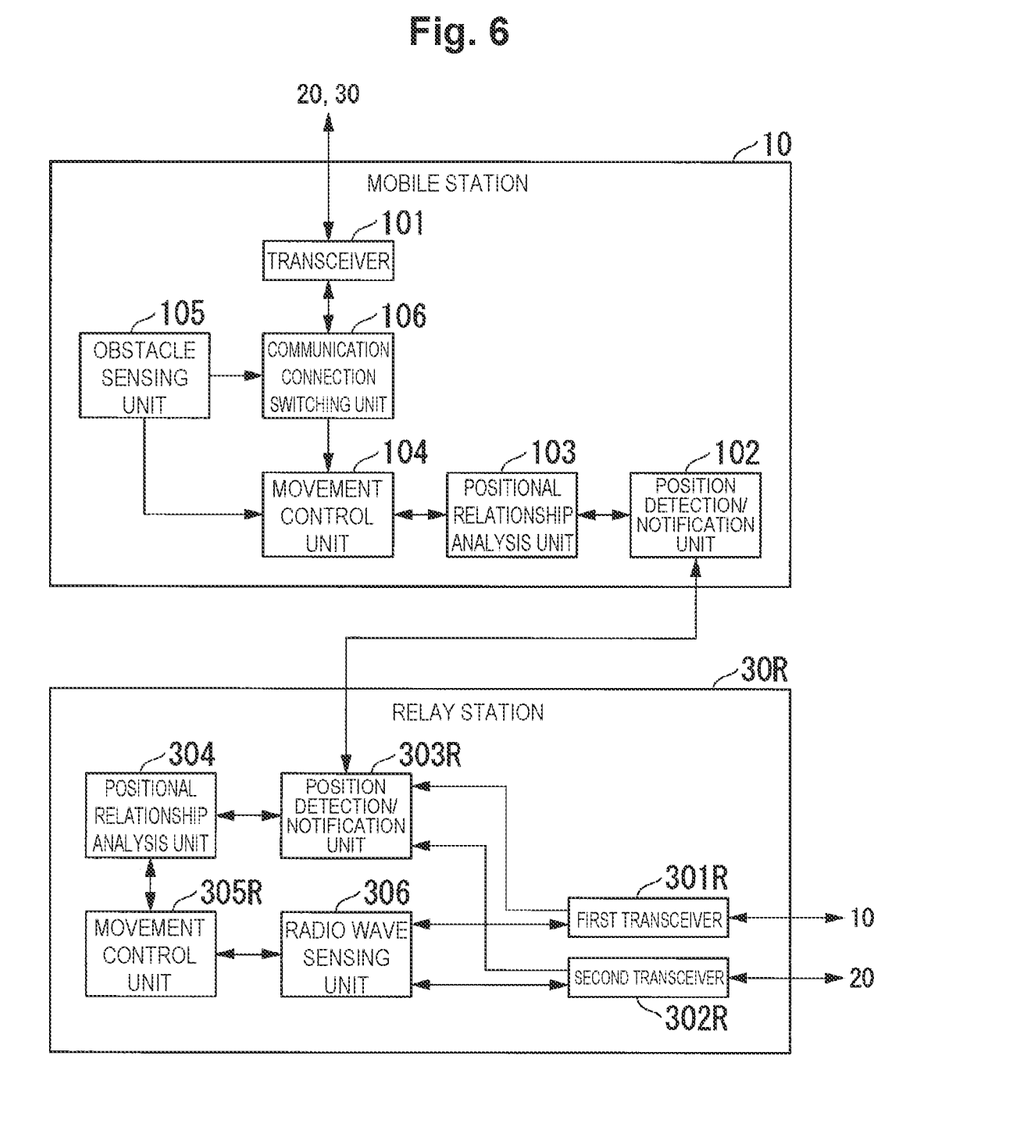
FIG. 6 is a block diagram showing a functional configuration of the communication system according to the second embodiment of the present invention.

FIG. 6 is a block diagram showing the functional configuration of the communication system according to the second embodiment of the present invention. As shown in FIG. 6, the communication system is configured to include the mobile station 10 and a relay station 30R.

Note that the same reference numeral is given to a functional block that has a common configuration to a functional block provided in the communication apparatus according to the first embodiment as described with reference to FIG. 3. Repeated explanation will be omitted, and only configurations that are newly added to the configuration of the communication apparatus according to the first embodiment will be described below.

The mobile station 10 is configured to include the transceiver 101, the position detection/notification unit 102, the positional relationship analysis unit 103, the movement control unit 104, the obstacle sensing unit 105, and the communication connection switching unit 106.

The relay station 30R is configured to include a first transceiver 301R, a second transceiver 302R, a position detection/notification unit 303R, the positional relationship analysis unit 304, a movement control unit 305R, and the radio wave sensing unit 306.

The first transceiver 301R measures the communication quality of communication between the mobile station 10 and its own relay station 30R. The first transceiver 301R outputs the value of the measured communication quality to the position detection/notification unit 303R. The second transceiver 302R measures the communication quality of communication between the base station 20 and its own relay station 30R. The second transceiver 302R outputs the value of the measured communication quality to the position detection/notification unit 303R.

When the value indicating the communication quality of communication between the base station 20 and its own relay station 30R has become less than or equal to the predetermined threshold, the position detection/notification unit 306R pauses the movement of its own relay station 30 via the movement control unit 305R. Thereafter, when the value indicating the communication quality of communication between the base station 20 and its own relay station 30R has become greater than or equal to the value indicating the communication quality of communication between the mobile station 10 and its own relay station 30R, the position detection/notification unit 306R restarts the movement of its own relay station 30 via the movement control unit 305R.

[Operation of Communication System]

An example of operation of the communication system will be described below with reference to the drawings.

Figure 7:
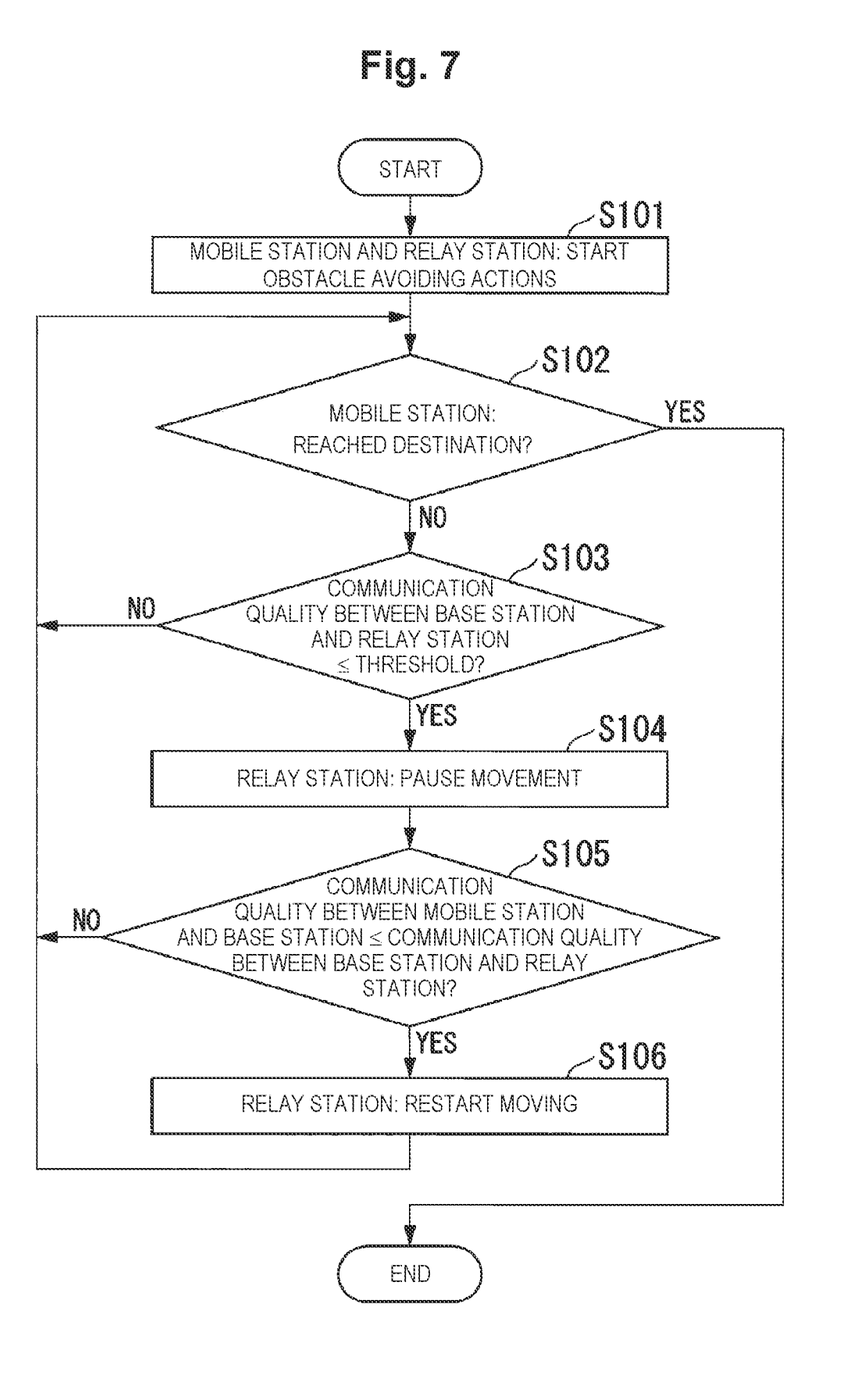
FIG. 7 is a flowchart showing operation of the communication system according to the second embodiment of the present invention.

FIG. 7 is a flowchart showing operation of the communication system according to the second embodiment of the present invention. Note that the flowchart shown in FIG. 7 shows operation after the obstacle avoiding actions by the mobile station 10 and the relay station 30 (i.e., step S009 in the flowchart shown in FIG. 4) are performed. Note that only operation newly added to the operation of the communication apparatus according to the first embodiment will be described below.

The mobile station 10 and the relay station 30 starts their obstacle avoiding actions (step S101).

When the mobile station 10 has reached the destination (step S102: Yes), the process shown in the flowchart of FIG. 7 ends.

When the mobile station 10 has not reached the destination (step S002: No), the mobile station 10 and the relay station 30 continues their obstacle avoiding actions.

When the value indicating the communication quality of communication between the base station 20 and the relay station 30 (in addition to MCS, a transmission rate, throughput measured in the past, a received signal strength indication (RSSI), and the like are assumed) has not become less than or equal to a predetermined threshold (step S103: No), the mobile station 10 and the relay station 30 continue their obstacle avoiding actions.

When the value indicating the communication quality of communication between the base station 20 and the own relay station 30 has become less than or equal to the predetermined threshold (step S103: Yes), the relay station 30 pauses its movement (step S104).

When the value indicating the communication quality of communication between the base station 20 and the relay station 30 is smaller than the value indicating the communication quality of communication between the mobile station 10 and the relay station 30 itself (step S105: No), the relay station 30 does not restart moving.

When the value indicating the communication quality of communication between the base station 20 and the relay station 30 has become greater than or equal to the value indicating the communication quality of communication between the mobile station 10 and the relay station 30 itself (step S105: Yes), the relay station 30 restarts moving (step S106).

As explained above, in the communication system according to each embodiment described above, the mobile station 10 pauses its movement and transmits a request to deploy a relay station 30 to the base station 20 when sensing the obstacle 50 to the communication path during movement toward the destination. Then, the relay station 30 moves to any position between the current position of the mobile station 10 and the position of the base station 20 according to a request from the base station 20, and the mobile station 10 and the base station 20 perform handover. Then, the mobile station 10 restarts moving, and the relay station 30 moves according to the position of the mobile station 10 so that the communication path connecting the mobile station 10, the relay station 30 itself, and the base station 20 may circumvent the obstacle 50.

The above configuration enables the communication system according to each embodiment described above to secure a communication path between the mobile station 10 and the base station 20 even when an unknown obstacle 50 is present between the destination to which the mobile station 10 is headed and the base station 20.

Note that the configuration of the communication system according to each embodiment described above is also applicable to, for example, communication control between the mobile station and the base station in the case where the mobile station ends up moving over a longer distance than the initial moving plan.

Although embodiments of the present invention have been described above with reference to the drawings, it is apparent that the above embodiments are merely illustrations of the present invention, and the present invention is not limited to the above embodiments. Accordingly, additions, omissions, replacements, and other changes of components may be made within a range not departing from the technical ideas and scope of the present invention.

Part or all of the mobile station 10 and the relay station 30 in the above embodiments may be implemented using a computer. In that case, they may be implemented by recording a program for implementing this function in a computer readable recording medium, and causing a computer system to read and execute the program recorded in this recording medium. Note that "computer system" here is intended to include an OS or hardware such as peripheral equipment. In addition, "computer readable recording medium" refers to a portable medium such as a flexible disk, a magneto-optical disk, a ROM, and a CD-ROM, and a storage apparatus such as a hard disk built in a computer system. Furthermore, a "computer readable recording medium" may also include something for dynamically holding a program for a short period of time such as a communication line in the case of transmitting a program via a network such as the Internet or a communication line such as a telephone line, and something for holding a program for a certain period of time such as a volatile memory inside a computer system serving as a server or a client in that case. In addition, the above program may be one for implementing part of the above-described function, one capable of implementing the above-described function in combination with a program already recorded in a computer system, or one implemented using a programmable logic device such as an FPGA (field programmable gate array).

REFERENCE SIGNS LIST 10 (10R) Mobile station
20 Base station
30 (30R) Relay station
50 Obstacle
101 Transceiver
102 Position detection/notification unit
103 Positional relationship analysis unit
104 Movement control unit
105 Obstacle sensing unit
106 Communication connection switching unit
301 (301R) First transceiver
302 (302R) Second transceiver
303 (303R) Position detection/notification unit
304 Positional relationship analysis unit
305 (305R) Movement control unit
306 Radio wave sensing unit

The invention claimed is:

1. A communication system comprising:
    a mobile station configured to:
        communicate with a wireless station;
        move toward a predetermined destination on a first moving route;
        sense an obstacle present on the first moving route toward the predetermined destination;
        in response to sensing the obstacle present on the first moving route:
            pause the movement toward the predetermined destination on the first moving route; and
            transmit a notification to the wireless station requesting for deployment of a relay station, wherein the relay station is configured to establish communication between the mobile station and the wireless station;
        in response to establishing communication to the relay station, move along a second moving route toward the predetermined destination while avoiding the obstacle; and
    the relay station being configured to:
        deploy to establish communications between the mobile station and the wireless station;
        establish the communications between the mobile station and the wireless station; and
        move to maintain a position where communication between the mobile station and the wireless station can be relayed according to movement of the mobile station along the second moving route.

2. The communication system according to claim 1, wherein
    the relay station keeps the position where relay is possible by moving so as to keep a position where the mobile station and the wireless station are unobstructed.

3. The communication system according to claim 1, wherein
    the relay station moves so as to be positioned in a region where the mobile station is present out of two regions divided by a straight line passing through a position on a plane of the predetermined destination and a position on a plane of the obstacle.

4. The communication system according to claim 1, wherein
    the relay station moves so as to be positioned in a region where the mobile station is present out of two regions divided by a straight line passing through a position on a plane of the mobile station and a position on a plane of the obstacle.

5. The communication system according to claim 1, wherein
    the relay station moves so that a difference between a value indicating communication quality of communication between the mobile station and the relay station and a value indicating communication quality of communication between the wireless station and the relay station becomes less than or equal to a predetermined threshold.

6. A communication method comprising:
    communicating, by a mobile station, with a wireless station;
    moving, by the mobile station, toward a predetermination destination on a first moving route;
    sensing, by the mobile station, an obstacle present on the first moving route toward the predetermined destination;
    in response to sensing the obstacle present on the first moving route:
        pausing, by the mobile station, the movement toward the predetermined destination on the first moving route; and
        transmitting, by the mobile station, a notification to the wireless station requesting for deployment of a relay station;
    deploying, by a relay station, to establish communication between the mobile station and the wireless station;
    establishing, by the relay station, the communications between the mobile station and the wireless station;
    in response to establishing communication to the relay station, moving, by the mobile station along a second moving route toward the predetermined destination while avoiding the obstacle; and moving, by the relay station, to maintain a position where communication between the mobile station and the wireless station can be relayed according to movement of the mobile station along the second moving route.

7. The communication method of claim 6, further comprises keeping, by the relay station, the position where relay is possible by moving so as to keep a position where the mobile station and the wireless station are unobstructed.

8. The communication method of claim 6, further comprises moving, by the relay station, so as to be positioned in a region where the mobile station is present out of two regions divided by a straight line passing through a position on a plane of the predetermined destination and a position on a plane of the obstacle.

9. The communication method of claim 6, further comprises moving, by the relay station, so as to be positioned in a region where the mobile station is present out of two regions divided by a straight line passing through a position on a plane of the mobile station and a position on a plane of the obstacle.

10. The communication method of claim 6, further comprises moving, by the relay station, so that a difference between a value indicating communication quality of communication between the mobile station and the relay station and a value indicating communication quality of communication between the wireless station and the relay station becomes less than or equal to a predetermined threshold.

11. The communication system of claim 1, further comprising:
   the wireless station configured to:
      receive the notification from the mobile station that requests for deployment of the relay station; and
      transmit a notification to the relay station that causes the relay station to deploy to establish the communications between the mobile station and the wireless station.

12. The communication system of claim 1, further comprising:
   the mobile station configured to:
      receive signals from the relay station;
      in response to receiving the signals from the relay station, switch to communicating with the relay station from the wireless station while moving along the second moving route toward the predetermined destination while avoiding the obstacle.

* * * * *